(12) United States Patent
Small

(10) Patent No.: US 6,259,381 B1
(45) Date of Patent: Jul. 10, 2001

(54) METHOD OF TRIGGERING AN EVENT

(76) Inventor: David A Small, 99 Kenerstone Circuit Tsabella Plains, Canberra (AU), 2905

( * ) Notice: Subject to any disclaimer, the term of this patent is extended or adjusted under 35 U.S.C. 154(b) by 0 days.

(21) Appl. No.: 09/068,047

(22) PCT Filed: Nov. 8, 1996

(86) PCT No.: PCT/AU96/00712

§ 371 Date: Jul. 2, 1998

§ 102(e) Date: Jul. 2, 1998

(87) PCT Pub. No.: WO97/17685

PCT Pub. Date: May 15, 1997

(30) Foreign Application Priority Data

Nov. 9, 1995 (AU) .................................................. PN 6476

(51) Int. Cl.[7] .................................................. G08G 1/123
(52) U.S. Cl. .......................... 340/988; 701/207; 701/300
(58) Field of Search .................................... 340/988, 995, 340/996, 970, 961, 994, 905; 701/200, 211, 207, 208, 300

(56) References Cited

U.S. PATENT DOCUMENTS

| 3,845,289 | 10/1974 | French ............................... 235/151.2 |
| 4,159,490 | 6/1979 | Wood ..................................... 360/12 |
| 4,163,123 | 7/1979 | Brodsky ................................. 179/15 |
| 4,190,819 | 2/1980 | Burgyan ................................. 340/23 |
| 4,224,669 | * 9/1980 | Brame . |
| 4,334,248 | 6/1982 | Maiocco ................................. 360/12 |
| 4,675,823 | * 6/1987 | Noland ................................. 340/970 |
| 4,774,672 | * 9/1988 | Tsunoda et al. ...................... 340/995 |
| 4,882,724 | 11/1989 | Vela et al. . |
| 4,893,246 | * 1/1990 | Iihoshi et al. ........................ 340/995 |
| 4,914,733 | * 4/1990 | Gralnick ............................... 340/961 |
| 5,270,708 | * 12/1993 | Kamishima .......................... 340/995 |
| 5,610,822 | 3/1997 | Murphy . |
| 5,614,898 | 3/1997 | Kamiya et al. ...................... 340/995 |

FOREIGN PATENT DOCUMENTS

| 0511447 | 11/1991 | (EP) | ............................ G08G/1/0969 |
| 0410 137 B1 | 11/1994 | (EP) | ............................ G08G/1/0962 |
| 0681278 | 4/1995 | (EP) | ............................ G08G/1/0968 |
| 0672918 A2 | 9/1995 | (EP) | ................................. G01S/5/16 |
| 91/14247 | 9/1991 | (WO) | ............................ G08G/1/0962 |
| 95/18432 | 7/1995 | (WO) | ............................... G08G/1/123 |
| 96/04633 | 2/1996 | (WO) | ............................ G08G/1/0968 |

* cited by examiner

Primary Examiner—Brent A. Swarthout

(57) ABSTRACT

A method and device for triggering an event in a roving apparatus is disclosed, whereby an event is triggered when the calculated position of the roving apparatus falls within a predetermined area and at least one other triggering criteria specified for the event is met, such that if the calculated position of the roving apparatus is at a position where predetermined areas overlap, events from any of the overlapping predetermined areas may be triggered in accordance with the triggering criteria of those areas.

24 Claims, 9 Drawing Sheets

Direction of Entry triggering

Substantial Area Triggering

Substantial Area Triggering

Armed Area Triggering

Armed Area with Trigger Area

Direction of Entry triggering

Direction of Entry Triggering incorporating Altitude

Step Ratio

Sector of Entry Triggering

Variable Shaped Trigger and Armed Areas

METHOD OF TRIGGERING AN EVENT

TECHNICAL FIELD

This invention relates to a method of triggering an event in a roving apparatus.

As used herein, the term "roving" is used to indicate that the apparatus may wander about without necessarily having a definite origin, route, or destination. It will be appreciated that such an apparatus does not require mapping means with route data.

This invention has particular but not exclusive application to the triggering of an audio and/or visual file in a roving hand-held unit.

The invention also has application in vehicles such as cars, planes, buses, and ferries.

BACKGROUND ART

European Patent Publication 410 137 to Bosch discloses the triggering of "specific information" when the current location of a vehicle corresponds to a triggering point within a street map, ie. "point triggering".

A system using Global Positioning Satellites (GPS) is disclosed in European Patent Publication 511 447 to Pioneer. In this system the position of an automobile is calculated by GPS and, when the automobile enters a pre-determined area, an audio-visual event relating to the area is triggered (see FIG. 1), ie. "area triggering".

Another prior art system is known from European Patent Publication 672 890 to Aisin. Aisin discloses a method of capturing Points of Interest (POIs) using a metaphorical "torch beam". The torch may be selectively switched between "high" and "low" beam and all POIs which fall within the beam are captured and played (see FIG. 2) in order of priority, ie. "beam triggering".

These known methodologies are too rudimentary to be functional in an environment where there may be multiple POIs in close proximity, where the apparatus roves in a non-fixed route manner, or where GPS data wanders, for example.

DISCLOSURE OF THE INVENTION

In one aspect the invention resides in a method of triggering an event in a roving apparatus, the method including:
associating one or more events with a locality;
specifying at least one triggering prerequisite for each event;
triggering an event if (a) the roving apparatus is within a predetermined proximity of the locality, and (b) the at least one triggering prerequisite specified for the event is met.

The triggering prerequisite may be, for example, direction of travel of the roving apparatus, position of the roving apparatus relative to the locality, increase in distance from the locality, time, day, date, temperature, password, or any other criteria.

In another aspect this invention resides in a method of triggering the playing of an audio and/or visual file in a roving apparatus, the method including:
associating a plurality of audio and/or visual files with a locality;
specifying at least one triggering prerequisite for each audio and/or visual file;
triggering an audio and/or visual file if (a) the roving apparatus is within a predetermined proximity of the locality, and (b) the at least one triggering prerequisite specified for the event is met,
and wherein the content of the audio and/or visual file is a reflection of the prerequisite specified for the audio and/or visual file.

BRIEF DESCRIPTION OF THE FIGURES

In order that this invention may be more easily understood and put into practical effect, reference will now be made to the accompanying FIGS in which.

BEST MODE

Figure 1:
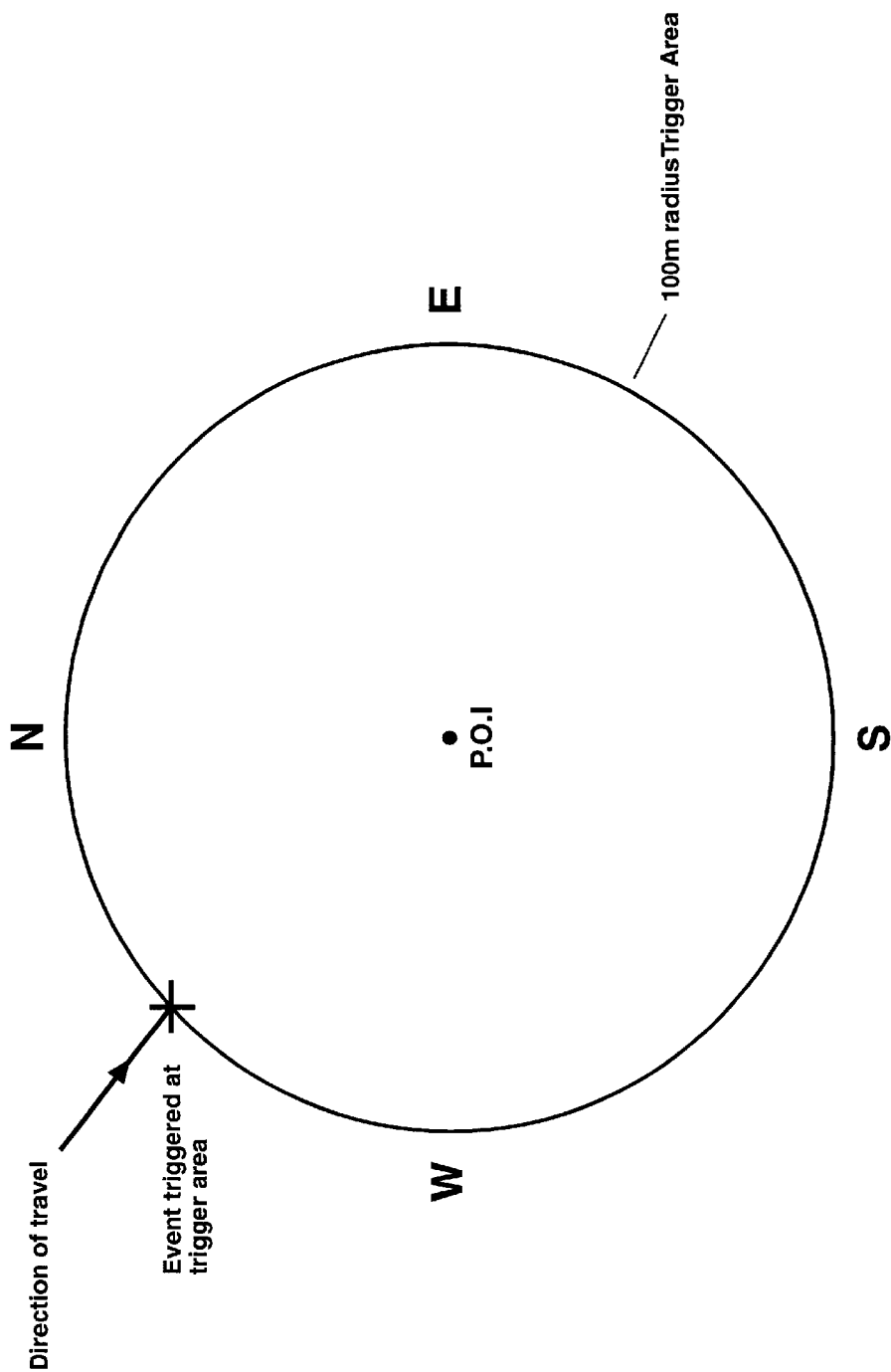
FIG. 1 is a schematic view of Pioneer's prior art methodology.
Figure 2:
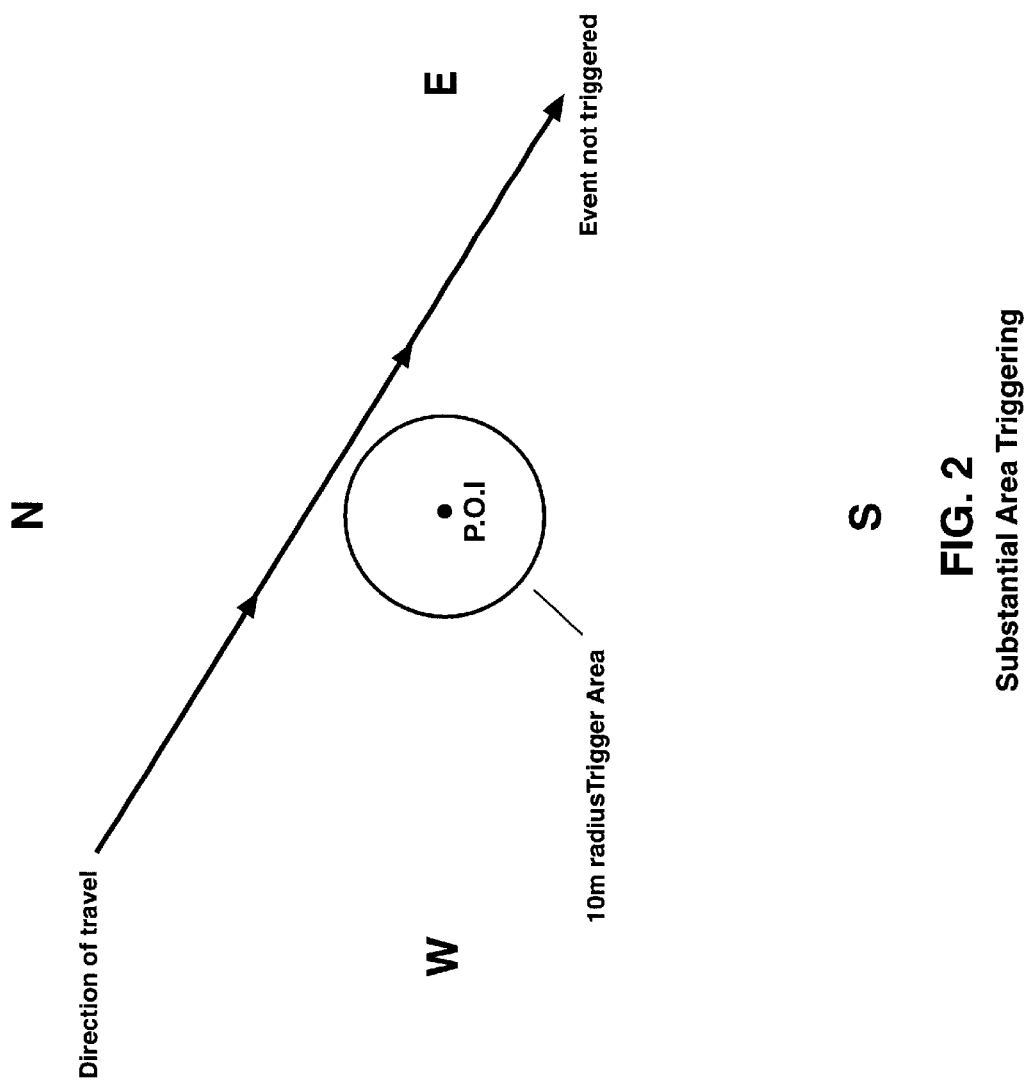
FIG. 2 is a schematic view of Aisin's prior art methodology.
Figure 3:
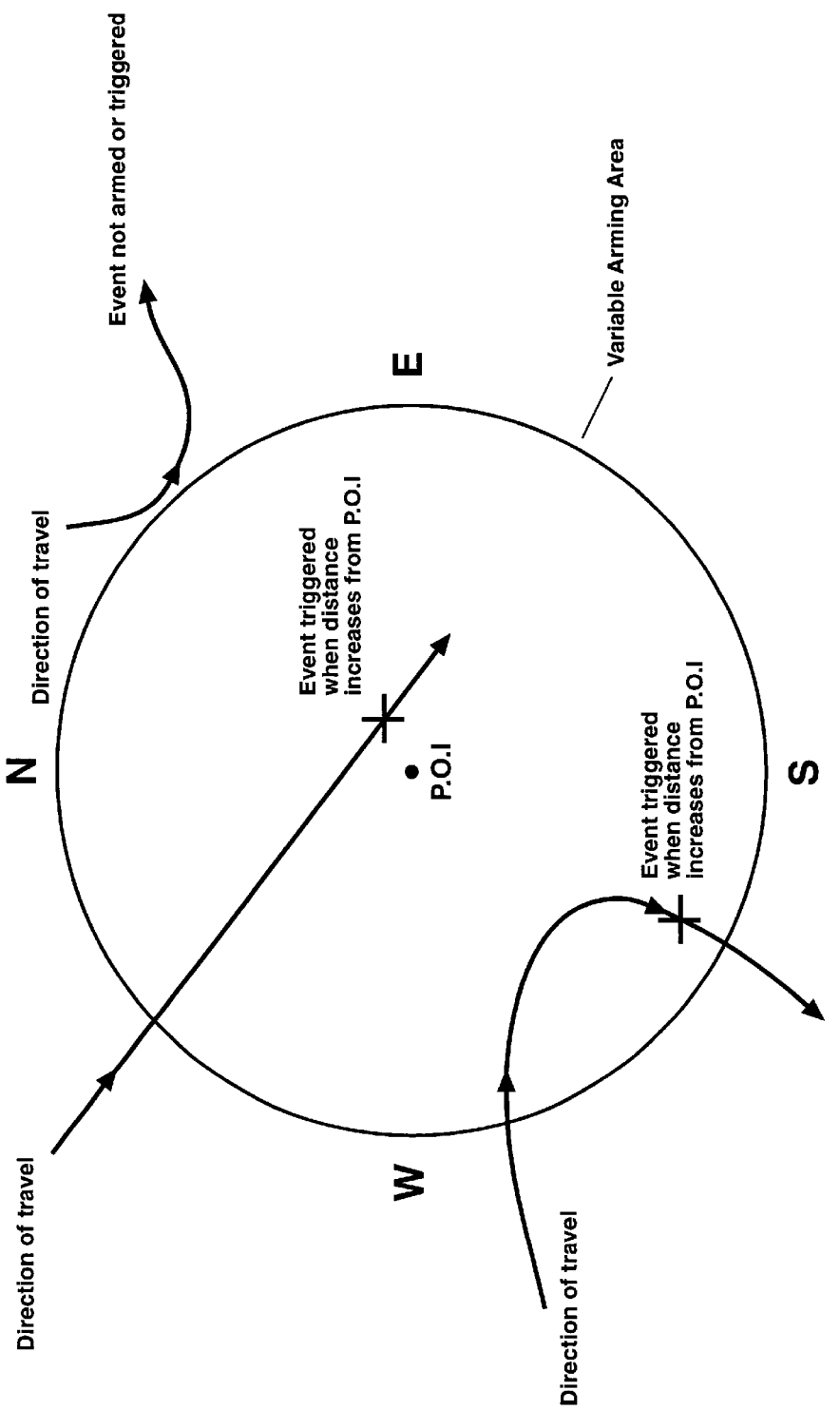
FIG. 3 is a schematic view of triggering according to the present invention in which the triggering prerequisite is an increase in distance from the POI.

Referring now to FIG. 3 there is illustrated an example of triggering according to the present invention. In this case the event is triggered when the calculated distance from the POI increases after the roving apparatus has entered the predetermined proximity to the locality. This type of triggering is particularly useful in situations where fixed routes cannot be followed. For example, if the apparatus is installed in a ferry and circumstances dictate that the ferry must turn away from the POI before reaching the POI then the event will be triggered immediately after the point of closest approach to the POI.

Figure 4:
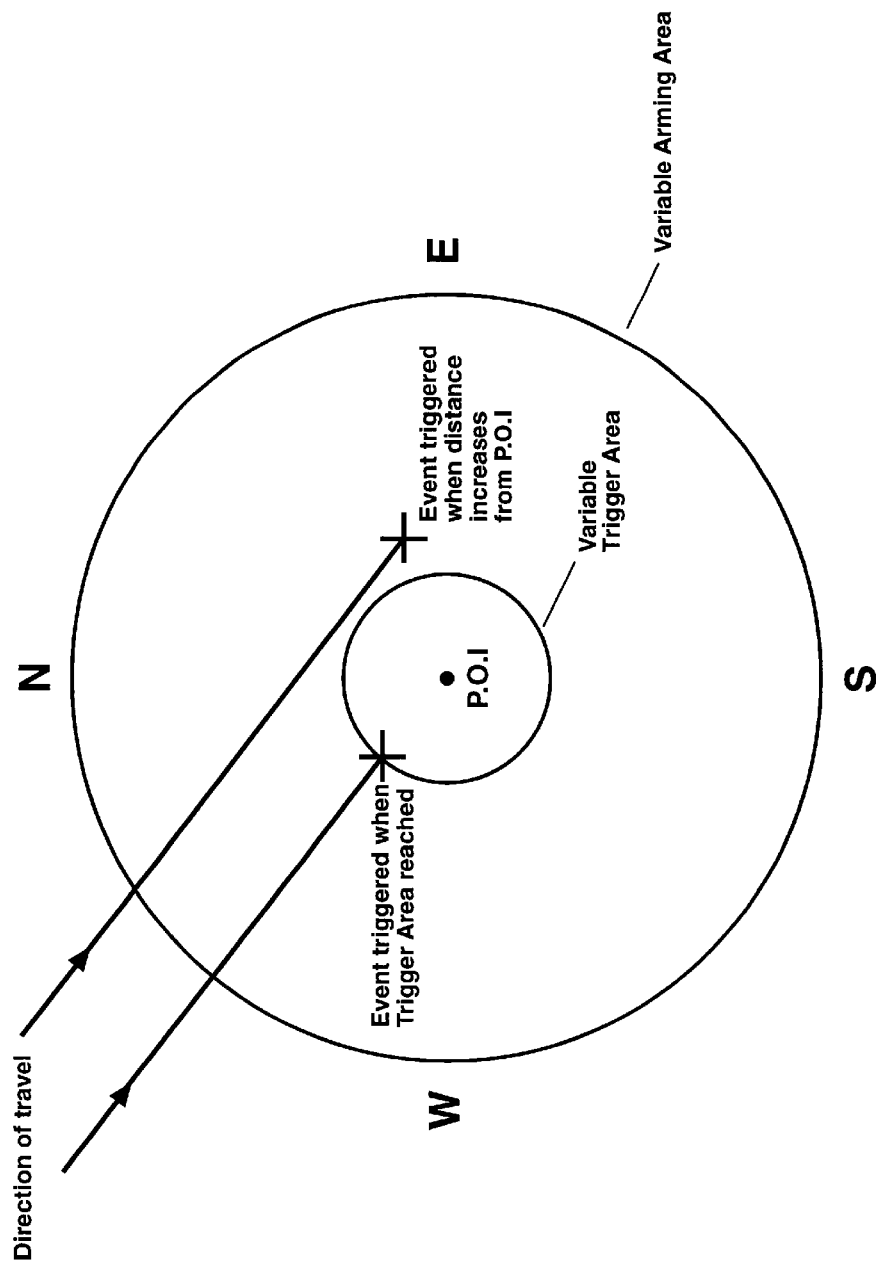
FIG. 4 is a schematic view of triggering according to the present invention in which the triggering prerequisite is an increase in distance from the POI or a correspondence with a second smaller area.

Referring now to FIG. 4 there is illustrated an example of a triggering system having two proximities relating to a locality, with the second proximity being within the first proximity. In this case the event is triggered if the calculated distance from the POI increases whilst within the main area or if the apparatus enters the inner smaller area.

In another embodiment the event is triggered when the apparatus departs the locality. This may be utilised for example when a ferry leaves its wharf and the exact wharf from which it leaves and the direction in which it leaves from the wharf is variable.

Figure 5:
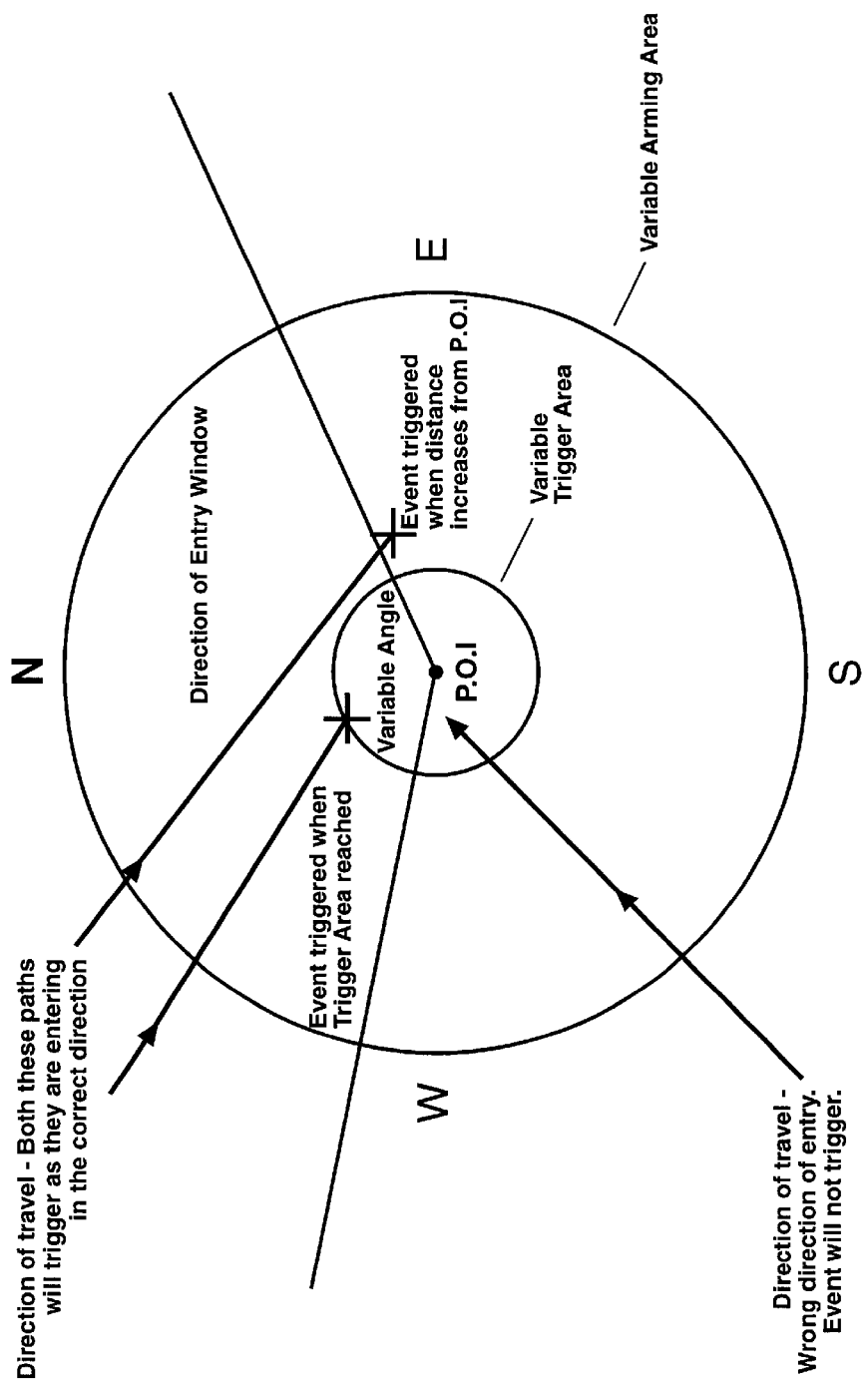
FIG. 5 is a schematic view of triggering according to the present invention in which the triggering prerequisite is direction of travel (and an increase in distance or a correspondence with a second smaller area)

Referring to FIG. 5, direction of travel can be used as the further criteria. In this regard the event will only be triggered if the apparatus is travelling in a predetermined direction or range of directions. This is particularly useful for alleviating false triggers in non-fixed route applications where a user may pass a point of interest in multiple directions whilst roving. Direction of travel is also particularly useful for adding relative position statements on the commentary, such as "On your left you will see . . . " or "On your right you will see . . . ". The statement can be further customised by specifying what relative aspect is being viewed, eg. ". . . you will see the Northern side of . . . "

Figure 6:
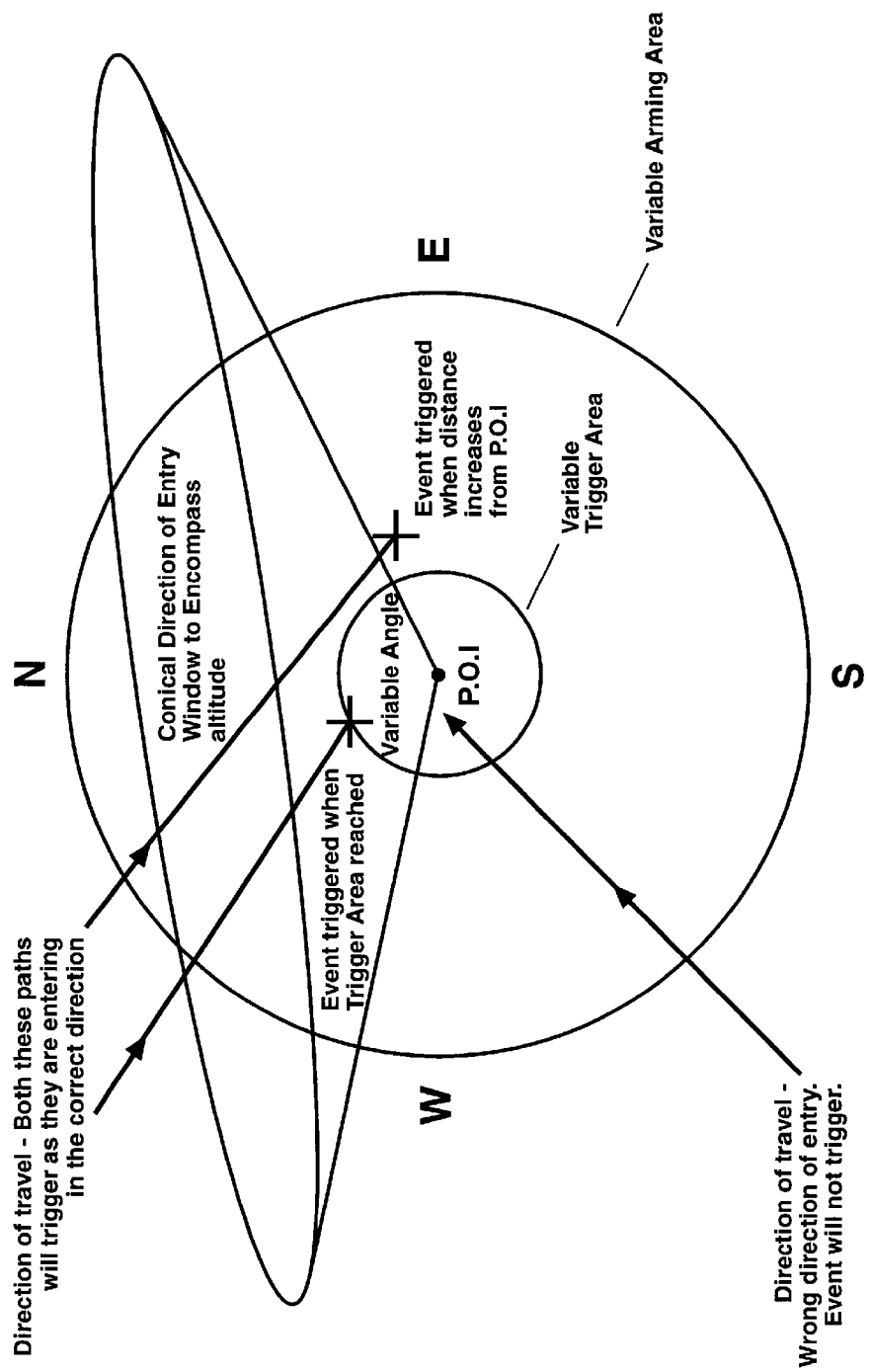
FIG. 6 is a schematic view of triggering according to the present invention in which the triggering prerequisite is an increase in distance from POI, however, the tolerable increase in distance is proportional to the distance from the POI.

Referring to FIG. 6, there is illustrated a system in which a so-called "step ratio" is applied. In this system the event is not triggered immediately when the calculated distance increases, as this increase may be due to GPS positional data wandering or due to the wandering of the apparatus itself. Accordingly the system hesitates before triggering the event. The event only triggers when the distance from the point of interest increases by an amount in excess of a tolerance amount. This tolerance amount is proportional to the calculated distance from the POI, ie. the tolerance is smaller when the calculated distance is smaller.

Figure 7:
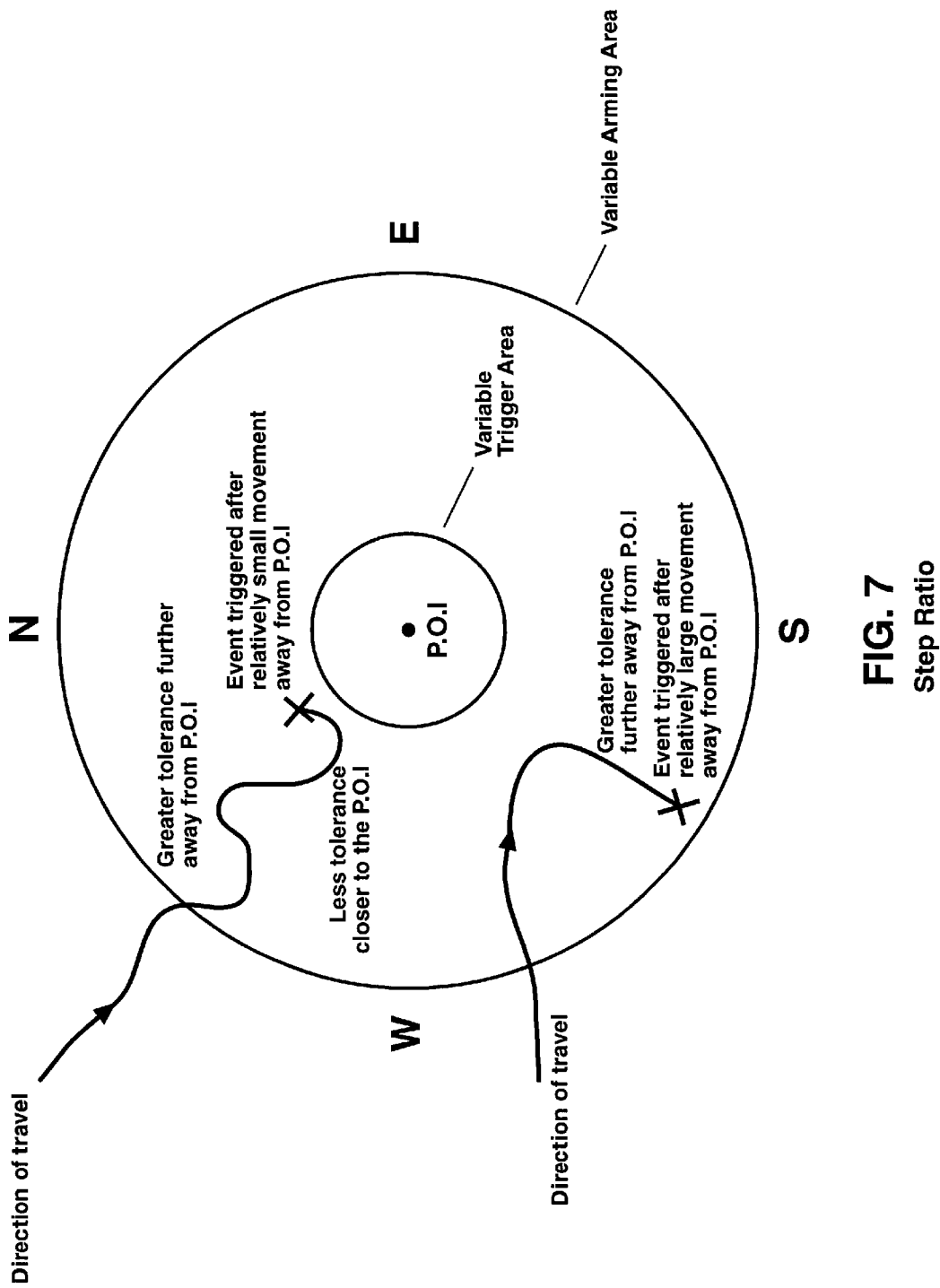
FIGS. 7–9 are a schematic view of triggering according to the present invention in which the triggering prerequisite is relative position of the roving apparatus, and different files exist for each portion or zone, the triggering is related to sector of entry, and a variable shaped trigger is used.
Figure 8:
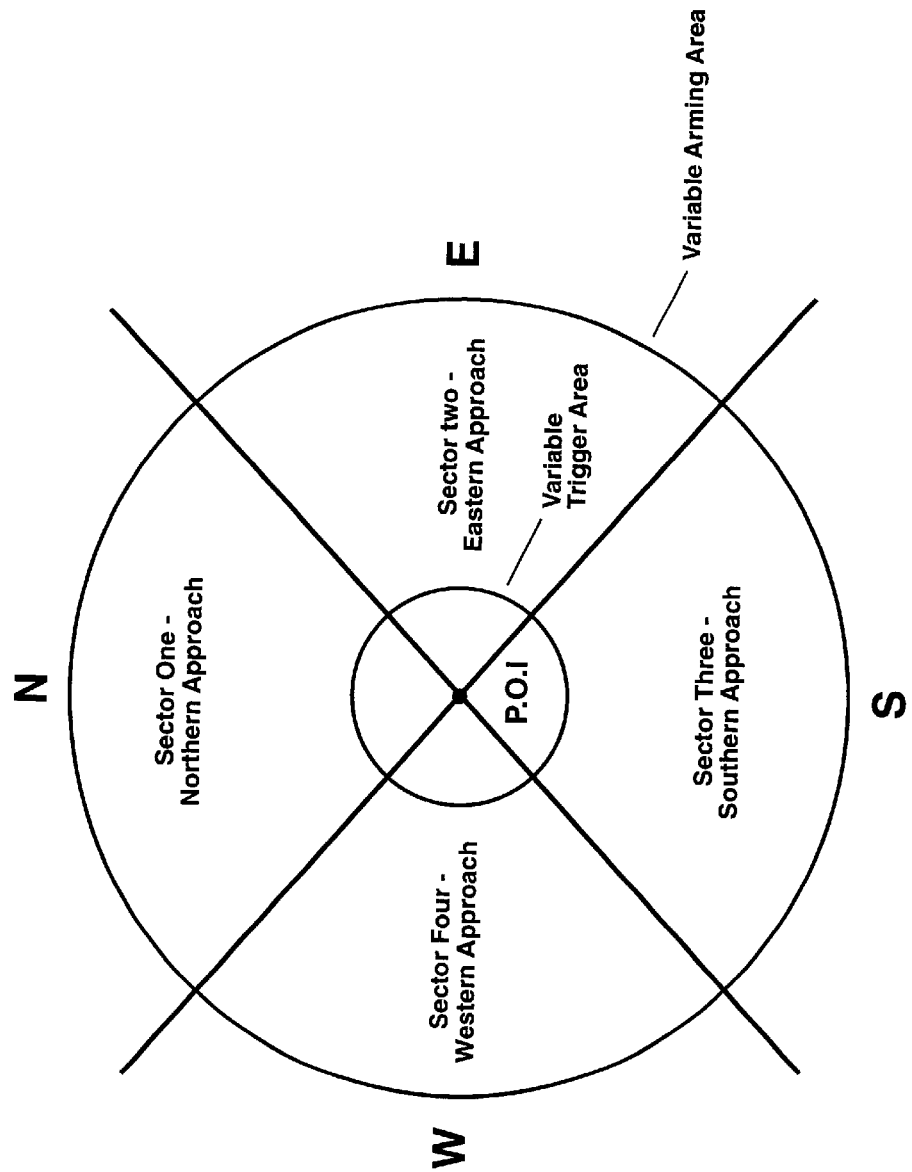
Figure 9:
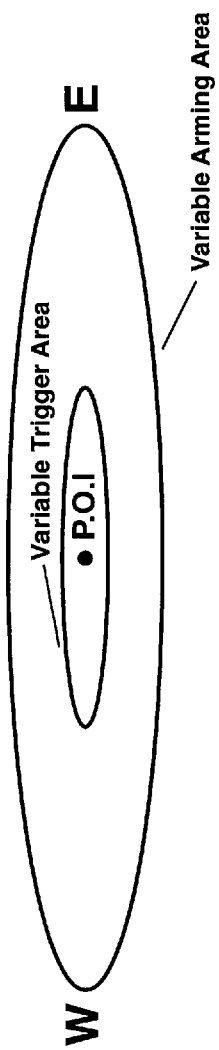

In FIG. 7 there is illustrated an example of relative position triggering. In this particular case the approaches to the POI are divided into four 90 degree portions although any number of variable size portions could be used. Accordingly, if a pedestrian approaches from the north and the feature to be discussed is located to the west of the POI, then they would receive a message "On your right you will see . . . ", if they approached from the south they would hear "On your left you will see . . . ", and if they approached from the east they would hear "Directly ahead of you . . . ".

Alternatively, if the feature is coincident with the point of interest, then a pedestrian who approaches from the north would receive a message "You can now see the front entrance of building X", if they approach from the south they would hear "You can now see the rear entrance of building X".

In the preferred embodiment of the present invention the apparatus includes a mobile audio/visual system which is portable. In a portable apparatus a tourist could for instance arrive at Pom Peii and meander about the ruins whilst automatically receiving information about relevant points of interest. The tourist need not travel in any fixed route, nor activate the information manually.

Alternatively, the system can be installed in a ferry, bus or train to provide information regarding, for example, points of interest, location of next stop, time of arrival etc. The system can also be used to send location, average speed etc data back to a central base. The invention therefore also provides an effective fleet management tool.

The ferry, bus or train usually follows an established route. At certain points along the route it is desirable that audio/visual announcements be made, eg "On your right you will see . . . ", or "This train is now arriving at Central" etc. The system ensures that such announcements are automatically made at the correct location without making any demands on the driver. The driver would, of course, be able to override the system or add further comments as necessary. The system may include a countdown timer or distance measurement which indicates to the driver when the next location triggered announcement will be made. Accordingly, the driver can add his or her comments without interrupting the next location triggered announcement.

Desirably, each file includes the relevant announcement followed by continuous filler music. When the subsequent location is reached the filler music is automatically faded and the next announcement made.

In some situations it is desirable to "wait then play". For example, it may be desirable that a particular file be played at a location where there is no GPS reception, eg. in a tunnel. In this circumstance the file may be triggered as the vehicle enters the tunnel, however there may be a 30 second delay between triggering and playing.

It is also preferable that the system flag any files which have been played so that they might be played once during a single session. The flags may be reset dependent on a predetermined increased distance from the locality, a predetermined elapse of time from trigger, or a predetermined location that resets all flags.

Each individual on a ferry, bus, train or plane may have a personal audio/visual system and the audio/visual files may be in a number of languages. A person on a tour may select their preferred language. Similarly, the files may also be in a number of personalities or have different presenters to suit different tastes.

The system could also be used to ensure that entertainment such as movies are played at the correct location en-route.

The system includes a clock or sources time and date information from the satellite such that time specific announcements can be made, eg 15 minutes out of Canberra the announcement might be "We will be arriving in Canberra at (present time plus 15 minutes)". Similarly, the system may include other date, time, day, weather specific information. For example, an announcement may be "Good Morning (time), and welcome to Canberra on the chilly (weather) winter's (date) day". Equally, certain files relating to tourist attractions which are closed on certain days can be suppressed on those days. The system may also include velocity specific announcements, eg. "You are travelling at 90 km/hr and you are reminded that the speed limit at this location is 80 km/hr".

The files may be stored in any suitable medium and may be periodically updated, for example by RF link. Thus, files including news or current affairs can be regularly updated and other program material can be updated as required.

As mentioned previously the system can be used as a fleet management tool. For example, specified locations having good mobile phone reception may be selected at which a bus or truck in transit may report via modem back to base with information such as position, average velocity, fuel consumption, etc. This avoids the need for the base to poll the vehicle which may be out of communication at the time that it is polled.

It will be understood that the methodology of the present invention provides a level of sophistication not present in the prior art. The methodology of the present invention involves a decision making process over and above the generic locality prerequisite, ie. other parameters are considered before triggering. This effectively adds a level of qualification to the triggering of an event.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. A method of triggering an event in a roving apparatus, said method comprising the steps of:
   a) defining a plurality of predetermined areas;
   b) associating one or more events with each of said predetermined areas;
   c) specifying at least one triggering criteria for each of said one or more events;

d) calculating the position of (the) said roving apparatus;
e) (evaluating) performing an evaluation of the status and position of (the) said roving apparatus in comparison to said at least one triggering criteria and the position of said predetermined areas; and
   i) if (the) said evaluation determines the roving apparatus is outside all predetermined areas, the roving apparatus maintains (said calculating) performing the evaluation of the status and position of the roving apparatus, without triggering an event;
   ii) if (the) said evaluation determines the roving apparatus is within one of (the) said predetermined areas, and said (the) at least one (said) triggering criteria specified for (an) a particular event is met, (the) said particular event is triggered;
   iii) if (the) said evaluation determines the roving apparatus is within (the) an overlapping portion of any overlapping predetermined areas, and (the) said at least one (said) triggering criteria specified for an event is met, events from any of the overlapping predetermined areas may be triggered in accordance with any one of said at least one triggering criteria for said overlapping predetermined areas;
   such that there is no requirement to specify triggering criteria for every area which the roving apparatus may traverse.

2. A method as claimed in claim 1, wherein the at least one triggering criteria is satisfied when there is an increase in distance from a predetermined point within (the) a predetermined area by the roving apparatus, with respect to a previously determined minimum distance.

3. A method as claimed in claim 1, wherein the at least one triggering criteria is satisfied when the bearing of the roving apparatus relative to a predetermined point falls within a predetermined range of bearings.

4. A method as claimed in claim 1, wherein the at least one triggering criteria is satisfied when the bearing of a predetermined point relative to the heading of the roving apparatus falls within a predetermined range of bearings.

5. A method as claimed in claim 1, wherein the at least one triggering criteria is satisfied when the roving apparatus is travelling in a predetermined direction, or range of directions.

6. A method as claimed in claim 1, wherein the at least one triggering criteria is satisfied when the calculated position of the roving apparatus falls within a smaller overlapping predetermined area within (the) any of said predetermined areas.

7. A method of triggering an event in a roving apparatus, the method comprising:
   a) defining a plurality of predetermined areas, where:
      i) the predetermined areas are irregularly distributed according to predetermined points-of-interest; and
      ii) some predetermined areas may overlap;
   b) associating one or more events with each predetermined area;
   c) specifying at least one triggering criteria for each event;
   d) calculating the position of the roving apparatus; and
   e) triggering an event if:
      i) the calculated position of the roving apparatus falls within a predetermined area; and
      ii) the at least one triggering criteria specified for the event is met such that if the calculated position of the roving apparatus is at a position where the predetermined areas overlap, events from any of the overlapping predetermined areas may be triggered in accordance with any one of said triggering criteria of those areas.

8. A method as claimed in claim 7, wherein the at least one triggering criteria is satisfied when there is an increase in distance from the predetermined point-of-interest within (the) a predetermined area by the roving apparatus, with respect to a previously determined minimum distance.

9. A method as claimed in claim 7, wherein the at least one triggering criteria is satisfied when the bearing of the roving apparatus relative to the predetermined point-of-interest falls within a predetermined range of bearings.

10. A method as claimed in claim 7, wherein the at least one triggering criteria is satisfied when the bearing of the predetermined point-of-interest relative to the heading of the roving apparatus falls within a predetermined range of bearings.

11. A method as claimed in claim 7, wherein the at least one triggering criteria is satisfied when the roving apparatus is travelling in a predetermined direction, or range of directions.

12. A method as claimed in claim 7, wherein the at least one triggering criteria is satisfied when the calculated position of the roving apparatus falls within a smaller overlapping predetermined area within (the) any of said predetermined areas.

13. A roving apparatus, comprising:
   (a) means for determining the position of the roving apparatus;
   (b) means for associating one or more events with at least one specified triggering criteria within a predetermined area;
   (c) means for evaluating the status and position of the roving apparatus in comparison to said specified triggering criteria and the position of (said) any predetermined area(s);
   (d) means to trigger an event responsive to said means for evaluating (means), whereby:
      i) if said means for evaluating (means) determines the roving apparatus is outside all predetermined areas, the roving apparatus maintains (said) evaluating (of) the status and position of the roving apparatus, without triggering an event;
      ii) if said means for evaluating (means) determines the roving apparatus is within (one of the said) any predetermined area(s), and said (the) at least one specified (said) triggering criteria (specified) for an event is met, the event is triggered;
      iii) if said means for evaluating (means) determines the roving apparatus is within (the) an overlapping portion of any overlapping predetermined areas, and said (the) at least one specified (said) triggering criteria (specified) for an event is met, events from any of the overlapping predetermined areas may be triggered in accordance with any one of said at least one specified triggering criteria for said overlapping predetermined areas.

14. A roving apparatus as claimed in claim 13, wherein the at least one specified triggering criteria is satisfied when there is an increase in distance from a predetermined point within said any predetermined area by the roving apparatus, with respect to a previously determined minimum distance.

15. A roving apparatus as claimed in claim 13, wherein the at least one specified triggering criteria is satisfied when the bearing of the roving apparatus relative to a predetermined point falls within a predetermined range of bearings.

16. A roving apparatus as claimed in claim 13, wherein the at least one specified triggering criteria is satisfied when the bearing of a predetermined point relative to the heading of the roving apparatus falls within a predetermined range of bearings.

17. A roving apparatus as claimed in claim 13, wherein the at least one specified triggering criteria is satisfied when the roving apparatus is travelling in a predetermined direction, or range of directions.

18. A roving apparatus as claimed in claim 13, wherein the at least one triggering criteria is satisfied when the calculated position of the roving apparatus falls within a smaller overlapping predetermined area within said any predetermined area.

19. A roving apparatus for triggering an event, the apparatus comprising:
   a) means for storing information specifying a plurality of predetermined areas which are irregularly distributed according to predetermined points-of-interest;
   b) means for storing information specifying events for each predetermined area;
   c) means for storing information specifying at least one triggering criteria for each event;
   d) means for calculating the position of the roving apparatus; and
   e) means for triggering an event responsive to the calculated position and the information of each of said storing means, the event being triggered if:
      i) the calculated position of the roving apparatus falls within a predetermined area; and
      ii) the at least one triggering criteria specified for the event is met, such that if the calculated position of the roving apparatus is at a position where the predetermined areas overlap, events from any of the overlapping predetermined areas may be triggered in accordance with any one of said triggering criteria of those areas.

20. A roving apparatus as claimed in claim 19, wherein the at least one triggering criteria is an increase in distance from a predetermined point within said one of a plurality of predetermined areas by the roving apparatus, with respect to a previously determined minimum distance.

21. A roving apparatus as claimed in claim 19, wherein the at least one triggering criteria is that the bearing of the roving apparatus relative to a predetermined point falls within a predetermined range of bearings.

22. A roving apparatus as claimed in claim 19, wherein the at least one triggering criteria is that the bearing of a predetermined point relative to the heading of the roving apparatus falls within a predetermined range of bearings.

23. A roving apparatus as claimed in claim 19, wherein the at least one triggering criteria is that the roving apparatus is travelling in a predetermined direction, or range of directions.

24. A roving apparatus as claimed in claim 19, wherein the at least one triggering criteria is that the calculated position of the roving apparatus falls within a smaller overlapping predetermined area within said one of a plurality of predetermined areas.

* * * * *